United States Patent Office 2,776,218
Patented Jan. 1, 1957

2,776,218

ARTICLE COMPRISING BORON NITRIDE AND ZIRCONIA

Kenneth M. Taylor, Lewiston, N. Y., assignor to The Carborundum Company, Niagara Falls, N. Y., a corporation of Delaware No Drawing. Application May 17, 1952, Serial No. 288,555

11 Claims. (Cl. 106—57)

This invention relates to bodies or articles of manufacture composed essentially of stabilized zirconia and boron nitride, and to compositions and methods for making the same.

There is a constant search for new compositions or bodies which will possess unexpected combinations of properties essential to or generally found to be desirable in specific fields of use. The bodies of the present invention possess certain combinations of properties and characteristics which render them of considerable value, and they offer outstanding possibilities in a number of fields of use. It is, therefore, to be understood that the zirconia-boron nitride bodies hereinafter more fully described are not to be considered as restricted to any particular field of use. However, their outstanding characteristics as a refractory material are particularly worthy of note and make them especially suitable for a number of refractory purposes. The present invention will therefore be primarily described in respect to the use of the herein described products for refractory purposes, although not intended to be limited thereto.

Above all a refractory body must possess refractoriness, that is, an ability to stand up under exposure to high temperatures without undue chemical or physical change. Other desirable characteristics sought in a refractory body or shape include an ability to resist sudden changes in temperature without cracking or other manifestations of body breakdown, a satisfactory high mechanical strength at elevated temperatures as well as at room temperature, chemical inertness and resistance to various corrosive and erosive substances and conditions, a resistance to oxidation, and a density and hardness dependent upon the use to which the refractory body or shape is to be put.

In order to obtain a high degree of perfection in respect of one or more of the above properties peculiarly desirable for the specific refractory purpose in mind it has usually been found necessary to forego the benefits of maximum performance in respect of certain other desirable properties. Consequently, various refractory compositions exceptionally suitable for one field of use are often found to be entirely unsatisfactory for other purposes. There is, therefore, a continual demand for refractory bodies of new composition which will meet those demands of a special nature which require novel combinations of properties not to be found in those compositions of a refractory nature already available.

It is an object of the present invention to provide bonded refractory bodies or shapes of unusual and distinctive compositions and properties.

It is another object of the present invention to provide refractory bodies or shapes having a particular combination of properties heretofore unavailable in refractory compositions.

It is another object to provide novel compositions of matter composed essentially of zirconium oxide, and particularly stabilized zirconium oxide, and minor amounts of boron nitride.

It is a further object to provide practical methods and compositions for making such articles.

Shapes or bodies made in accordance with the present invention are composed essentially of zirconium oxide and boron nitride. The zirconium oxide is preferably a stabilized zirconium oxide in which all or a major portion of the zirconia is of the cubic crystalline variety such as a zirconium oxide which has been stabilized with around 5% of calcium oxide. The boron nitride in the body should not amount to more than 20% by weight of the article since greater amounts of boron nitride result in articles of extreme softness and lacking in the necessary strength required for most practical applications. As a matter of fact, for most applications it is desired to keep the amount of boron nitride down below 15% of the total weight of the body. As the amount of boron nitride is further decreased the density, hardness and strength of the article becomes greater. For example, articles of very satisfactory density, strength and hardness composed of 10% by weight of boron nitride and 90% of stabilized zirconium oxide have been made. Because of the marked difference in density of boron nitride (2.25) and zirconium oxide (5.49) a composition of 10–15% by weight of boron nitride and 90–85% zirconium oxide by weight contains around 21–30% by volume of boron nitride. However, where the greater strength, hardness and density are not necessarily required for the application in mind there are advantages in using the higher amounts of boron nitride within the limits mentioned above in order to obtain articles which are lighter in weight and having greater resistance to thermal shock. The bodies or articles of the present invention are made by mixing the two ingredients together with a temporary binder such as a wax or the like, cold pressing the material to the desired shape and firing the article in an inert atmosphere such as in an atmosphere of helium to a temperature of from 1400° to 1700° C.

The boron nitride used in carrying out the present invention may be a commercial grade of boron nitride material available on the market. However, I prefer to use a boron nitride material made in accordance with the process described in my copending application Serial No. 288,553 filed concurrently herewith and wherein the boron nitride is made by forming a porous pelleted mixture of boric acid or boric oxide and tricalcium phosphate and nitriding the pelleted mixture by heating in a suitable furnace in ammonia gas at a temperature of around 900° C. After the nitriding step the resulting nitrided pellets are treated with dilute hydrochloric acid to dissolve the tricalcium phosphate and other extraneous material. The undissolved boron nitride after several washings with water is usually treated with hot 95% alcohol solution to further lower the content of extraneous material and dried by allowing to stand overnight at room temperature followed by heating for two hours at 300° F. A typical analysis of the resulting boron nitride is as follows:

| | Percent |
|---|---|
| Boron | 41.45 |
| Nitrogen | 44.00 |
| Free boric acid (calculated as $H_3BO_3$) | .75 |
| Silica | .28 |
| Calcium | Trace |
| Phosphate ($PO_4$) | Trace |
| Material volatile at 110° C. | .26 |
| Extraneous matter, estimated to be combined oxygen | 13.26 |

Any of the commercial grades of zirconium oxide, which is a well-known material, can be used in carrying ou the present invention, although it is preferred to use a form of zirconium oxide which has been stabilized in the course of its manufacture. For example, a zirconium oxide which I have used with good results in carrying out the present invention is one which has been stabilized prior to use. The zirconium oxide is substantially entirely in the cubic crystal form and the material contains about 5.5% of calcium oxide.

In order that the invention may be fully understood, the following examples are submitted as illustrative of the compositions for and manner of carrying out the present invention:

EXAMPLE I

Refractory shapes comprising stabilized zirconia and boron nitride have been made as follows:

The following mixture was ground for 90 hours in a ball mill having a sintered tungsten carbide lining:

90 parts by weight of stabilized zirconia (200 mesh and finer) containing about 5.5% CaO.

10 parts by weight of boron nitride (made as described in my copending application Serial No. 288,553).

The ball milled material was 20 microns and finer. To about 10 parts by weight of the ball milled material was added .5 part by weight of "Carbowax" No. 4000 dissolved in 1 part by weight of benzene and the mixture ground in a mortar until the benzene had evaporated. According to the "Hand Book of Material Trade Names" by Zimmerman and Lavine (published by Industrial Research Service, Dover, New Hampshire, 1953), page 110, "Carbowax" is a group of non-volatile, solid polyethylene glycols, soluble in both water and aromatic hydrocarbons. They resemble natural waxes in appearance and texture, but are soluble in a much wider range of solvents. Their aqueous solutions possess binding properties. The same source of authority states that "Carbowax" No. 4000 is a hard, waxy solid having specific gravity of 1.2, freezing range of 50–55° C., a flash point greater than 475° F., and a Saybolt viscosity of 500–700 seconds at 210° F. The mixture was then molded to the desired shape as, for example, in the form of small test bars 1½" x ½" x approximately ¼" at a pressure of 30,000 pounds per square inch.

The temporary binder of "Carbowax" was removed by slowly heating the molded shape to 400° C. The bars were then fired in an atmosphere of helium to a maximum temperature of 1700° C. and held at the maximum temperature for about 10 minutes.

The resulting bars were sound and strong. The sandblast penetration was .004 inch as compared to .010 inch for plate glass when subjected to the same sandblast test.

EXAMPLE II

For purposes of comparison, small bars were made according to procedures the same as that followed for the making of the bars of Example I except that the proportions of stabilized zirconia and bonon nitride were changed to 80 parts by weight of the zirconia and 20 parts by weight of boron nitride. The zirconia was of the stabilized variety, the same as that used for Example I. The resulting bars were much softer showing a sandblast penetration of .049 inch which is over ten times as soft as the penetration obtained with bars made in accordance with Example I using a higher percentage of zirconia. The bars containing 20% boron nitride are too soft for most refractory purposes so that 15% of boron nitride is considered to be the maximum of boron nitride which can be tolerated in articles made for most purposes. However, it is believed that as much as 20% boron nitride can be used for those articles where greater hardness is not essential and where certain other properties imparted by the boron nitride are to be desired.

Somewhat lower temperatures may also be utilized in firing bodies of the herein described compositions. For example, a body composed of 90% stabilized zirconia and 10% boron nitride prepared as above described were fired for 30 minutes at 1400° C. in an atmosphere of helium and the resulting bodies showed a sandblast penetration of .012 inch and were sound and strong.

It is further noted that the maximum temperature of firing should be maintained below a certain point since when the articles are fired at an excessive temperature they are partially disintegrated and part of the zirconia is converted to zirconium boride. For example, when a body consisting of 80% stabilized zirconia and 20% boron nitride was fired at 2000° C. it partially disintegrated, the presence of zirconium boride in the resulting product having been established by X-ray diffraction analysis.

The table below presents fabricating data and physical properties of various bodies comprising boron nitride and stabilized zirconia in various proportions and made in accordance with the present invention. The table shows the effect of the varying amounts of boron nitride upon the resulting body in respect of the hardness and weight loss incurred during the firing of the article. Test bar No. 8 is included in the table to demonstrate the effect of over-firing bodies of the described compositions.

Table

BODIES COMPRISING ZIRCONIA AND BORON NITRIDE FIRED IN AN ATMOSPHERE OF HELIUM

| Bar No. | Raw Mix Composition, percent by weight | Firing | | Sandblast penetration,[1] inches | Weight Loss In Firing, Percent |
|---|---|---|---|---|---|
| | | Max. Temp., °C. | Holding Time, Min. | | |
| 1 | 80 ZrO$_2$; 20 BN | 1,700 | none | .033 | 0.7. |
| 2 | 90 ZrO$_2$; 10 BN | 1,700 | none | .015 | 0.0. |
| 3 | 95 ZrO$_2$; 5 BN | 1,700 | none | .003 | 0.4 gain. |
| 4 | 90 ZrO$_2$; 10 BN | 1,400 | 30 | .012 | 0.3 |
| 5 | 95 ZrO$_2$; 5 BN | 1,400 | 30 | .006 | 0.0 |
| 6 | 80 ZrO$_2$; 20 BN (mix milled). | 1,700 | 10 | .049 | 4.3. |
| 7 | 90 ZrO$_2$; 10 BN (mix milled). | 1,700 | 10 | .004 | 1.3. |
| 8 | 80 ZrO$_2$; 20 BN (Bar 1 refired). | 2,000 | none | .227 | 23.5. |

[1] Standard penetration on plate glass when subjected to the same penetration test is .010 of an inch.

While I have described in the above examples the making of molded bodies in which the body is molded and fired to the exact shape or form in which it is intended for use, the present invention is not intended to be so restricted. Another way of making and using the zirconia-boron nitride bodies of the present invention is to mold the raw batch of material into briquettes or other shapes or otherwise compress a mass of the material having a composition in the desired proportions, after which the resulting briquettes or compressed bodies are fired in the manner already described. After removal from the furnace, they are crushed to granular form of the desired grit size. The resulting granular material can then be used in loose granular form as a high temperature refractory material or as a layer of insulation in industrial furnace chambers or as insulation around jet engines and rocket combustion chambers or the like. It may also be used as a loose filtering medium or as a catalyst or catalyst carrier material. The granular material can also be bonded by means of sintered metals, vitreous or ceramic bonds or other bonding material to form articles suitable for many of the industrial uses set forth elsewhere herein.

Likewise, articles or bodies can be made in accordance with the present invention in which pore-forming materials are incorporated in the raw batch from which the body is made for the purpose of providing a greater degree of porosity in the final body. A pore-forming material such as carbon or the like, which requires oxidation for removal from a body would require a preliminary burning out of the pore-forming material at lower temperatures. Therefore, the pore-forming material preferably should be a material which is removed by volatilization during the drying and/or firing operation such as powdered or granular naphthalene, various organic resinous materials such as phenolic resins and the like or one which provides pores by reason of the generation of a gas. The resulting bodies, which have greater porosity than those made with no pore-formers, are particularly useful in the fabrication of porous filtering media, catalysts and catalyst carriers, insulation bodies and the like, whether in crushed, granular form or in the form of molded shapes of predetermined contour.

It is to be understood that the products of the present invention in its various modifications are not limited to any specific field or fields of use such as might be defined by the specific examples previously set forth. The products can be made in any desired shape as well as provided in granular aggregate form. They are, therefore, not only suited for many of the uses for which industrial refractories are required, including bricks, blocks, setter tile, muffles, kiln furniture, and special shapes for application in and around furnaces and other high temperature equipment, but they are also well suited for many specialty high temperature applications, such as jet engine combustion chambers, linings for exhaust nozzles, rocket combustion chambers and exhaust nozzles, turbine blades, stator blades, lens fusion blocks, spark plug bodies, and the like. They are also suitable for the fabrication of laboratory ware, including combustion boats, crucibles, burner holders, and other shapes. The resistance of such bodies to chemical attack make them highly suitable for the making of articles used in the containing, conveying, and handling of many acids, alkalies, and other corrosive chemicals, including such articles as chambers and chamber linings, crucibles, pipes and pipe fittings, and other sundry shapes. The bodies of the present invention, particularly when modified by the use of pore-formers in the raw batch from which the bodies are made, are also highly useful as diffusion and filtering media, such as diffusion tubes and plates, filtering tubes, plates and shapes, or as catalysts or catalyst carriers and supports. The materials and articles of the present invention can also be used for making abrasive articles such as grinding wheels, sharpening stones, razor hones, and other grinding and polishing shapes and materials. The present bodies offer possible applications in the electrical and radio industry including supports in electric light bulbs, radio tubes, X-ray tubes and radar equipment, resistors and grid leaks.

Having described the present invention it is desired to claim:

1. As a new article of manufacture, a body consisting essentially of stabilized zirconia and boron nitride, the stabilized zirconia amounting to 80% to 95% by weight of the body.

2. As a new article of manufacture, a body composed of 85% stabilized zirconia and 15% boron nitride.

3. As a new article of manufacture, a body consisting essentially of zirconia stabilized with about 5% calcium oxide and 5% to 20% by weight of boron nitride.

4. A refractory article consisting essentially of stabilized zirconia and 5% to 10% of boron nitride.

5. As a new article of manufacture, a body consisting essentially of zirconia which is predominantly of cubic crystalline habit and 5% to 20% by weight of boron nitride.

6. As a new article of manufacture, a body consisting essentially of zirconia containing around 5% of calcium oxide based on the weight of the zirconia content of the body and 5% to 20% by weight of boron nitride.

7. A method of making bonded shapes of stabilized zirconia and boron nitride which comprises preparing a mixture of stabilized zirconia and boron nitride, said mixture containing 5% to 20% by weight of boron nitride, forming an article of the desired shape therefrom, and firing the formed body in an inert atmosphere at 1400° C. to 1700° C.

8. A method of making bonded shapes of stabilized zirconia and boron nitride which comprises preparing a mixture of stabilized zirconia and boron nitride, said mixture containing 5% to 20% by weight of boron nitride, forming an article of the desired shape therefrom, and firing the formed body in helium at 1400° C. to 1700° C.

9. A method of making bonded shapes of zirconia and boron nitride which comprises preparing a mixture of zirconia and boron nitride, said mixture containing 5% to 20% by weight of boron nitride, forming an article of the desired shape therefrom, and firing the formed body in an inert atmosphere at 1400° C. to 1700° C.

10. As a new article of manufacture, a body consisting essentially of zirconia and boron nitride, the zirconia amounting to 80% to 95% by weight of the body.

11. A refractory article consisting essentially of zirconia and 5% to 10% of boron nitride.

References Cited in the file of this patent

UNITED STATES PATENTS

| | | |
|---|---|---|
| 1,337,264 | Podszus | Apr. 20, 1920 |
| 1,420,980 | Eichenberger | June 27, 1922 |
| 2,352,530 | Fulcher et al. | June 27, 1944 |
| 2,372,236 | Wainer | Mar. 27, 1945 |
| 2,463,404 | McKinley | Mar. 1, 1949 |

FOREIGN PATENTS

| | | |
|---|---|---|
| 478,016 | Great Britain | 1938 |